United States Patent Office 2,799,568
Patented July 16, 1957

2,799,568
PLANT GROWTH REGULATION

Seward E. Allen, Overland Park, Kans., and Clarence W. Huffman, El Dorado, Ark., assignors, by mesne assignments, to Monsanto Chemical Company, St. Louis, Mo., a corporation of Delaware No Drawing. Application June 24, 1955, Serial No. 517,910

10 Claims. (Cl. 71—2.7)

The present invention relates to a composition for regulating the growth of plants, and more particularly to a composition which demonstrates a degree of selectivity in its action, permitting its use on soil planted to certain agronomic crops to control the growth of selected non-agronomic plants with little or no harm to the planted field crop.

In recent years the demand of farmers and agriculturists generally has been for chemicals which could be applied to the soil which would prevent or at least retard the growth of certain indigenous weeds and grasses with little or no effect on the crop plants to which the soil might be planted. The savings in labor costs would obviously be rather substantial in the case of many small crops, if initial hand cultivation could be eliminated. Materials of general phytotoxicity are known for this purpose, and in more recent years selectively active herbicides have appeared.

Broadly speaking, it is desirable for a composition of the class described to be selectively active against as much non-agronomic growth as possible while being non-active against as broad a spectrum of field crops as possible. Unfortunately, however, most selectively active plant growth regulating compounds which exhibit herbicidal activity tend to demonstrate their activity on the basis of whether the plant is a monocotyledon or a dicotyledon, and therefore a herbicide which is active against narrow leaf grasses is likely to also be active against such field crops as corn and wheat. Similarly, herbicides which are active toward broad leaf plants such as morning glory and pigweed are prone to be active against such agronomic growth as cotton. This cleavage in selective activity is not entirely borne out in the case of grasses, however, as different species of grasses demonstrate markedly different degrees of resistance to herbicides in both pre-emergence and post-emergence applications.

Other considerations involved in developing better herbicides are cost of the herbicide, ease of application, and degree of toxicity. A good herbicide should be fairly toxic in low concentrations against the growth to be exterminated or regulated, but at the same time, not so toxic that wind-borne dust, when applied in this form, carried to adjacent fields is likely to cause serious damage to the crops growing therein, particularly where the herbicide is absorbed through the foliage as well as the roots. It is also desirable to employ a herbicide which is selectively active in preventing sprouting of non-agronomic growth as well as being active in eradicating such growth after emergence.

It is the chief object of the present invention to provide a composition which meets the above criteria to an improved degree.

According to the present invention, we have found that nitrourea exhibits surprisingly good plant growth regulating activity at economical concentrations, with a degree of selectivity making its use particularly attractive to farmers engaged in raising crops such as corn and cotton. Nitrourea has been found to be selective in destroying certain broad leaf dicotyledonous plant growth, with little or no damage to agronomic narrow leaf monocotyledenon growth such as corn. Corn may be substantially cleared of broad leaf plants such as the morning glory and pigweed. While nitrourea cannot be applied to cotton to clear other undesirable growth without damage to the cotton, we have found this compound to be a good desiccant when applied to cotton prior to the use of mechanical pickers. Furthermore, new leaf growth on cotton so treated is extremely chlorotic, substantially eliminating the possibility of staining the cotton being picked. While nitrourea is most effective against broad leaf growth, I have found that application in proper concentration is also effective in retarding the growth of some of the narrow leaf grasses such as ryegrass, without serious effect on narrow leaf row crops such as corn.

Nitrourea may be produced commercially at a cost appreciably below many of the herbicidal chemicals on the market. Treatment of urea nitrate for example, with sulfuric acid gives the desired nitrourea.

The herbicidal activity of nitrourea is demonstrated in both pre-emergence and post-emergence applications, it being possible to vary the form of application to suit the needs of the individual agriculturists. The nitrourea may be applied in the form of a dilute aqueous solution prior to emergence of seedlings or subsequent thereto. If preferred, the material may be dusted by mixing the nitrourea with an inert extending material such as talc, or pumice etc. or a sprayable emulsion can be prepared by dissolving the nitrourea in a suitable solvent and adding an emulsifying agent sufficient for the purpose. A number of such emulsifiers are commercially available.

Nitrourea is an effective plant growth regulant over a fairly wide range of concentrations as demonstrated by the seed germination tests which follow. A relatively few pounds per acre is sufficient to inhibit the growth of many of the non-agronomic plants. Post-emergence applications are more effective at lower concentrations than is the pre-emergence application.

The examples which follow illustrate the manner of practicing the present invention. Unless otherwise indicated in the examples, "parts" is intended to mean parts by weight.

EXAMPLE 1

The plant growth regulating activity of nitrourea was determined by germination tests of wheat (Pawnee) and radish (Crimson-Giant) seeds. Seeds of these species were planted on filter paper in Petri dishes (10 seeds per dish) and moistened with 5 ml. of dilute aqueous solutions of nitrourea. Distilled water was used as a control. After four days in an air-conditioned dark room maintained at 28° C. and 70% relative humidity, the seedlings were removed and the longest root measured. Aqueous solutions having concentrations of 1, 10 and 100 p. p. m. of nitrourea were tested. The results of these tests are given in Table 1.

Table 1

| Solution Concentration | Root Length, mm. | |
|---|---|---|
| | Wheat | Radish |
| Water (control) | 70 | 40 |
| 1 p. p. m. Nitrourea | 65 | 36 |
| 10 p. p. m. Nitrourea | 65 | 26 |
| 100 p. p. m. Nitrourea | 8 | 7 |

EXAMPLE 2

The herbicidal activity of nitrourea was also determined by a test commonly known as a "pre-emergence test."

Seeds of corn, cotton, ryegrass, beans, bindweed and pigweed were planted in soil in boxes having an exposed area of 2 sq. ft. After two days, a mixture of nitrourea and talc was uniformly spread over the soil surface at rates of 8, 16, 32 and 48 pounds of nitrourea per acre. Throughout the course of the tests, all the boxes were watered whenever necessary. Good growth conditions were maintained during most of the test period (night temperatures occasionally dropped to 50° F., afternoon temperatures occasionally rose to 90° F.). The tests were terminated 40 days after the seeds were planted.

When the tests were terminated, control crops were in approximately the following stages of growth:

Corn_____ 24 in. tall.
Cotton_____ 4–6 in. tall, 3–5 leaves.
Ryegrass_____ 5–8 in. tall.
Bindweed_____ 2–4 in. tall.
Beans_____ 12–18 in. tall, actively blooming, some small pods developed.
Pigweed_____ 3–5 in. tall, actively blooming.

The results of the pre-emergence tests are given in Table 2. Percent stand is a measure of the number of growing plants in the nitrourea treated soil as compared to the number of growing plants in the untreated soil. Percent yield is a measure of the weight of plant growth produced in the treated soil as compared to the weight of crops produced in the untreated soil.

It will be noted from the data set forth in Table 2 for pre-emergence applications that nitrourea at a rate of 16 pounds/acre affected only pigweed, and was only moderately toxic to this plant. At the 16 pounds application rate, the pigweed was severely damaged, without injury to the other plants. When applied at a rate of 32 lbs./acre, cotton plants developed chlorosis and a very poor growth rate. Ryegrass was also stunted and chlorotic at all stages. Bindweed and beans were also affected, with the treatment being lethal for pigweed. When applied at a rate equivalent to 48 lbs./acre, the treatment was lethal toward pigweed and bindweed. The effect on beans and cotton was the same as for the 32 lb. rate. The growth of ryegrass was severely retarded.

Table 2

| Crop | 8 lb./acre | | 16 lb./acre | | 32 lb./acre | | 48 lb./acre | |
|---|---|---|---|---|---|---|---|---|
| | Percent Stand | Percent Yield | Percent Stand | Percent Yield | Percent Stand | Percent Yield | Percent Stand | Percent Yield |
| Corn | 100 | 100 | 100 | 100 | 100 | 100 | 100 | 100 |
| Cotton | 100 | 100 | 100 | 100 | 100 | 30 | 100 | 30 |
| Ryegrass | 100 | 100 | 100 | 100 | 75 | 25 | 50 | 25 |
| Bindweed | 100 | 100 | 100 | 100 | 100 | 50 | 0 | 0 |
| Beans | 100 | 100 | 100 | 100 | 100 | 75 | 100 | 75 |
| Pigweed | 75 | 50 | 30 | 20 | 10 | 5 | 0 | 0 |

EXAMPLE 3

The herbicidal activity of nitrourea was further determined by a "post-emergence" or foliage test.

Seeds of corn, cotton, ryegrass, beans, morning glory and pigweed were planted in soil in boxes having an exposed area of 2 sq. feet. After 23 days the crops were sprayed with an aqueous emulsion of nitrourea at a rate of 8.0 pounds of nitrourea per acre. The emulsion was prepared by dissolving 350 mg. of nitrourea in 4 ml. of dimethyl formamide, adding 12 drops of Agrimul GM (an emulsifying agent comprising a polyoxyethylene glycol ester-alkylaryl sulfonate mixture sold by Nopco Chemical Company), and diluting to 40 ml. with distilled water. Application of 10.0 ml. of this emulsion per sq. ft. of soil is equivalent to 8.4 lb. of nitrourea per acre; however, since some drift loss is inevitable when spraying small areas, this rate is assumed to be 8 lb./acre. It had been determined previously that dimethyl formamide and Agrimul GM as used in this emulsion were not toxic to the crops tested.

At the time of spraying, control crops were in approximately the following stages of growth:

Corn_____ 8–12 in. tall.
Cotton_____ 2–3 in. tall, 3 leaf stage (including primary leaves).
Ryegrass_____ 3–4 in. tall.
Bindweed_____ 1–2 in. tall, 3–5 leaves.
Beans_____ 6–8 in. tall, primary leaves mature, first trifoliate leaf about 1 in. in diameter.
Pigweed_____ 1–2 in. tall, in bloom due to photoperiod effect.

Throughout the course of the tests, all the boxes were watered whenever necessary. Good growth conditions were maintained during most of the test period (night temperatures occasionally dropped to 50° F., afternoon temperatures occasionally rose to 90° F.) The tests were terminated 17 days after the crops had been sprayed.

When the tests were terminated, control crops were in approximately the following stages of growth:

Corn_____ 24 in. tall.
Cotton_____ 4–6 in. tall, 3–5 leaves.
Ryegrass_____ 5–8 in. tall.
Bindweed_____ 2–4 in. tall.
Beans_____ 12–18 in. tall, actively blooming, some small pods developed.
Pigweed_____ 3–5 in. tall, actively blooming.

The results of the foliage tests are given in Table 3. Percent stand is a measure of the number of growing plants in the nitrourea sprayed crops as compared to the number of growing plants in the untreated control crops. Percent yield is a measure of the weight of plant growth produced with the spray treatment as compared to the weight of crops produced without the spray treatment.

Table 3

| Crop | 2 lb./acre | | 4 lb./acre | | 8 lb./acre | |
|---|---|---|---|---|---|---|
| | Percent Stand | Percent Yield | Percent Stand | Percent Yield | Percent Stand | Percent Yield |
| Corn | 100 | 100 | 100 | 90 | 100 | 75 |
| Cotton | 100 | 30 | 100 | 20 | 0 | 0 |
| Ryegrass | 100 | 75 | 100 | 75 | 100 | 50 |
| Bindweed | 100 | 50 | 100 | 20 | 0 | 0 |
| Beans | 100 | 75 | 75 | 35 | 50 | 25 |
| Pigweed | 50 | 25 | 0 | 0 | 0 | 0 |

For the post-emergence applications set forth in Table 3 above, 2 lbs./acre of nitrourea was sufficient to cause moderate leaf burn with subsequent chlorosis of cotton and bindweed. Ryegrass and beans were slightly burned with pigweed being severely burned. When applied at rates corresponding to 4 and 8 lbs./acre, slight to extreme leaf burn was noted for all the plants treated with corn and ryegrass being affected the least. The 4 lb. rate was sufficient to substantially desiccate all of the cotton leaves, and cause extreme chlorosis in the young new leaves.

While the invention has been described in terms of preferred nitrourea compositions suitable for controlling the growth of certain indigenous weeds and grasses, and their forms of application for certain plants tested, it is to be understood that the invention is not so limited. Modifications will occur to those skilled in the art, and are intended to be encompassed by the appended claims.

What is claimed is:

1. The method of regulating the growth of plants which comprises applying to said plants and surrounding earth containing same an amount of nitrourea sufficient to regulate the growth of said plants.

2. A method as claimed in claim 1 wherein said nitrourea is applied in the form of an aqueous spray.

3. A method as claimed in claim 1 wherein said nitrourea is applied in the form of a dust.

4. A method as claimed in claim 1 wherein said nitrourea is applied in the form of an emulsion.

5. The method of treating soil to selectively kill weeds which comprises applying to the surface of the soil prior to the emergence of agronomic plant seedlings a herbicidal amount of nitrourea.

6. The method of treating soil after emergence of plant seedlings to kill off selected non-agronomic plant growth which comprises applying to said seedlings a herbicidal amount of nitrourea.

7. A method for destroying undesired plants which comprises applying to said plants a toxic quantity of a herbicidal composition comprising nitrourea as the active ingredient.

8. A composition adapted to be applied to plant seedlings to selectively inhibit their growth, said composition comprising a herbicidal amount of nitrourea in dimethyl formamide together with a small amount of an emulsifying agent.

9. A process of producing plant leaf desiccation comprising applying to said plants the compound nitrourea in a concentration and amount sufficient to dry up said leaves.

10. A process of producing chlorosis in plant leaves comprising applying nitrourea to said plants in a concentration and amount sufficient to induce said chlorosis.

References Cited in the file of this patent

UNITED STATES PATENTS 2,376,474     Burrows et al. _____ May 22, 1945

OTHER REFERENCES

J. Amer. Chem. Soc. 51 (1929), page 1795.